United States Patent [19]
Kaneko et al.

[11] Patent Number: 4,821,172
[45] Date of Patent: Apr. 11, 1989

[54] APPARATUS FOR CONTROLLING DATA TRANSFER BETWEEN STORAGES

[75] Inventors: Sigeru Kaneko; Yoshio Kiriu, both of Hadano, Japan

[73] Assignee: Hitachi, Ltd., Tokyo, Japan

[21] Appl. No.: 83,662

[22] Filed: Aug. 10, 1987

[30] Foreign Application Priority Data

Sep. 4, 1986 [JP] Japan .................... 61-208794

[51] Int. Cl.[4] .............................................. G06F 13/00
[52] U.S. Cl. .............................................. 364/200
[58] Field of Search ................................ 364/200, 900

[56] References Cited

U.S. PATENT DOCUMENTS 4,229,790 10/1980 Gillilano et al. .................... 364/200
4,325,120 4/1982 Colley et al. ....................... 364/200

Primary Examiner—Thomas M. Heckler
Assistant Examiner—Maria Napiorkowski
Attorney, Agent, or Firm—Fay, Sharpe, Beall, Fagan, Minnich & McKee

[57] ABSTRACT

An apparatus for controlling a data transfer between storages in an information processing system having a main storage, an extended storage, and a processor in which data is transferred between the main storage and the extended storage by use of a synchronous instruction and an asynchronous instruction. The apparatus includes a unit to hold data transfer control information specified by the asynchronous instruction and a unit to hold data transfer control information specified by the synchronous instruction. Depending on a synchronous instruction or an asynchronous instruction, the data transfer is controlled to be achieved according to data transfer control information held in the unit associated with the instruction. The content of the unit is updated depending on the amount of data to be transferred. When a request of a data transfer is made by a synchronous instruction during a data transfer caused by an asynchronous instruction, the data transfer of the asynchronous instruction is interrupted to control the data transfer of the synchronous instruction to be executed. When the data transfer is completed, based on the content of the unit to hold data transfer control information of the asynchronous instruction, the data transfer of the asynchronous instruction interrupted is resumed.

3 Claims, 10 Drawing Sheets

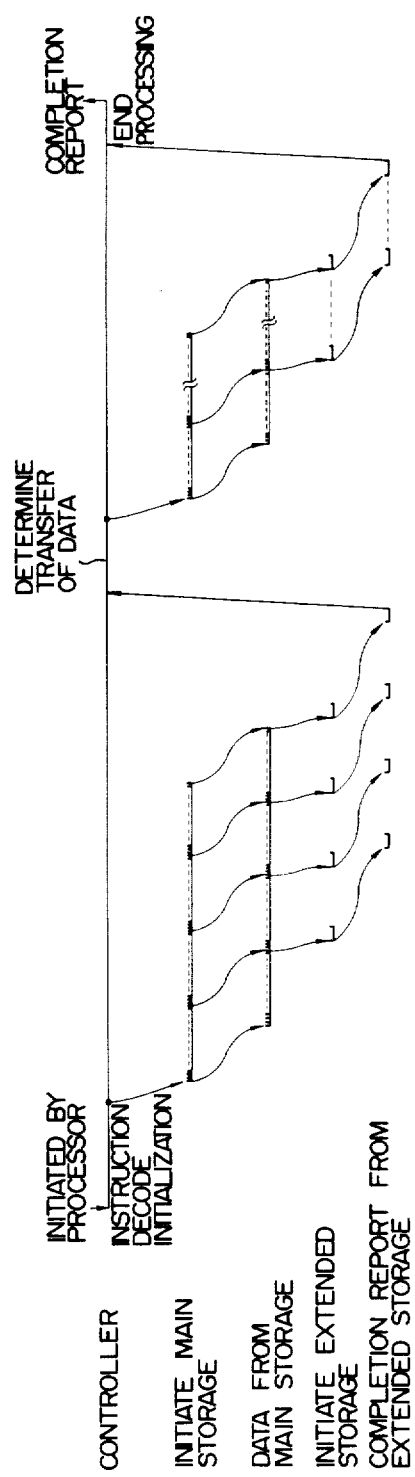

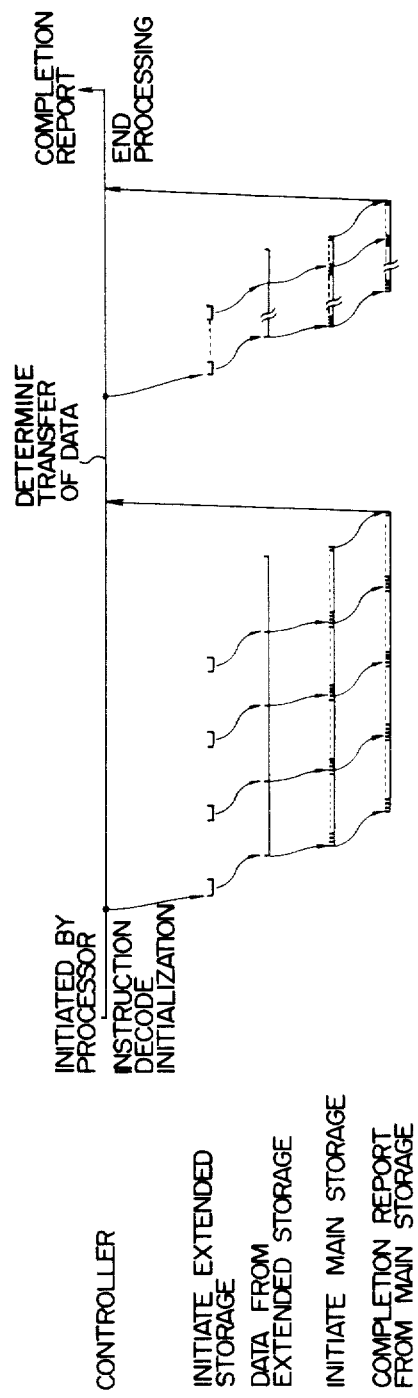

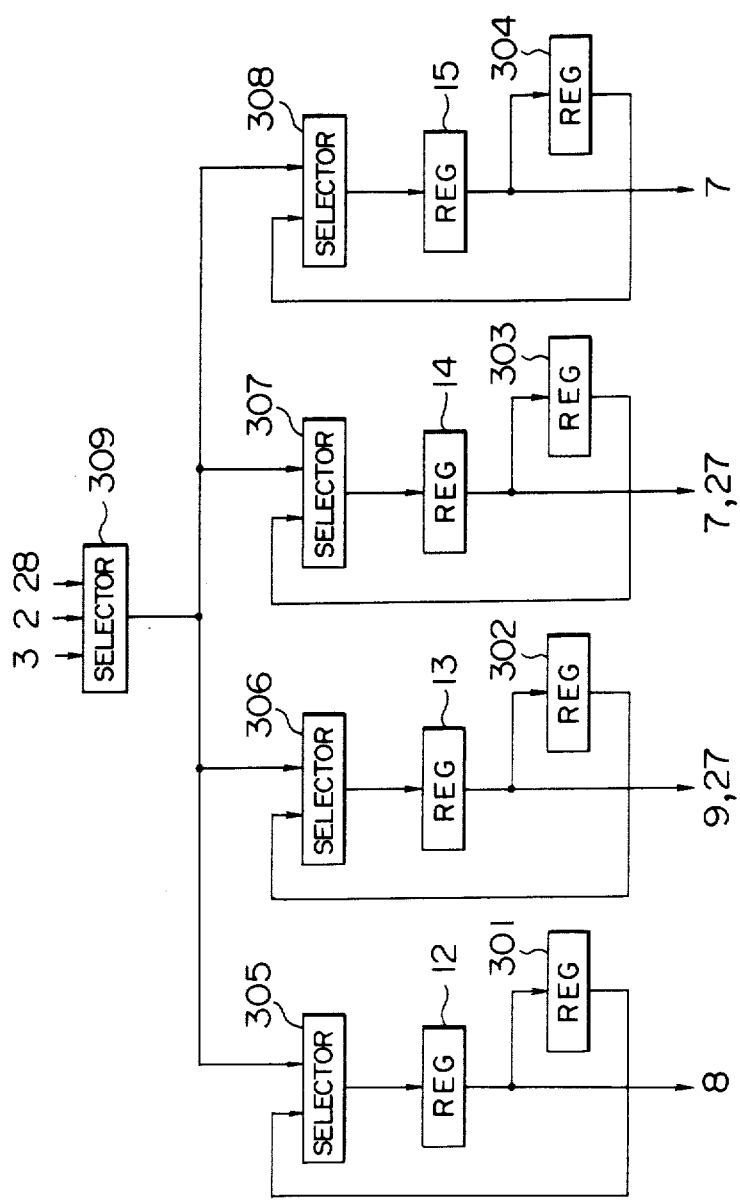

APPARATUS FOR CONTROLLING DATA TRANSFER BETWEEN STORAGES

BACKGROUND OF THE INVENTION

1. Field of the Invention

The present invention relates to an apparatus for controlling data transfer between storages in an information processing system having a main storage and an extended storage in which the data transfer between the main storage and the extended storage is controlled.

2. Description of the Prior Art

In an information processing system having a main storage and an extended storage, there are two primary usages of the extended storage. First, the extended storage is used by an operating system, for example, for a virtual storage or the extended storage is subjected to a roll-in or a roll-out for each job when a job is to be changed. In such an operation, since it is requested to execute the operation in concurrence with an execution of a user program, the extended storage is generally initiated with an asynchronous instruction (START I/O instruction). Secondly, the extended storage is used by user programs, for example, as a work file. In this case, since the operation must be instantaneously achieved, the extended storage is generally initiated with a synchronous instruction (MOVE instruction).

When these two ways of usage are adopted, there occurs a case where the extended storage is initiated with a synchronous instruction from a user program during an execution of a data transfer caused by an asynchronous instruction. In such a case, according to the conventional technology, the initiation by the synchronous instruction is effected only after the data transfer of the asynchronous instruction is completed. Incidentally, the operations of the extended storage by use of the synchronous and asynchronous instructions have been described, for example, in Japanese Patent Unexamined Publication No. 58-9276. According to the prior art technology, since the extended storage cannot be initiated with a synchronous instruction while a data transfer is being executed by use of an asynchronous instruction, there is a problem that it may occur that an instantaneous data transfer between the main storage and the extended storage, which data transfer is requested by the synchronous instruction, cannot be achieved.

SUMMARY OF THE INVENTION

It is therefore an object of the present invention to provide an apparatus for controlling data transfer between storages in which the extended storage is operated with a synchronous instruction and an asynchronous instruction and in a case where a synchronous instruction is issued while a data transfer is being executed with an asynchronous instruction between the main storage and the extended storage, the data transfer caused by the asynchronous instruction is interrupted so as to immediately effect a data transfer with the synchronous instruction.

The data transfer control apparatus according to the present invention includes information hold means for holding control information of a data transfer to be conducted by a synchronous instruction and information hold means for holding data transfer information associated with an asynchronous instruction wherein the data transfers between the storages are controlled depending on data transfer control information held in the information hold means respectively associated with the synchronous instruction and the asynchronous instruction, each instruction being issued to transfer data. In addition, according to an amount of data to be transferred, the contents of the hold means are updated. In a case where a data transfer request is made by use of a synchronous instruction during an execution of a data transfer with an asynchronous instruction, the data transfer is so controlled that the data transfer by the asynchronous instruction is interrupted with the content of the hold means associated with the asynchronous instruction held remaining therein and the data transfer by the synchronous instruction is executed; and after the data transfer by the synchronous instruction is completed, the data transfer by the asynchronous instruction is resumed according to the content held in the hold means associated with the asynchronous instruction.

Since the hold means for holding data transfer control information are disposed for the synchronous instruction and the asynchronous instruction, respectively, when a synchronous instruction is issued during a data transfer caused by an asynchronous instruction, the data transfer being executed can be arbitrarily interrupted to effect the synchronous instruction so as to minimize the processing time of the synchronous instruction. Furthermore, the contents of the hold means need not be changed; consequently a period of time to be elapsed from the interruption of the execution of the asynchronous instruction to the initiation of the execution of the synchronous instruction can be made very small.

Incidentally, the apparatus may be disposed with a unit of hold means for holding data transfer control information and save means wherein when an execution of an asynchronous instruction is interrupted due to an issuance of a synchronous instruction, data transfer control information of the asynchronous instruction is saved in the save means, data transfer control information of the synchronous instruction is set to the hold means to execute the synchronous instructions, and after the data transfer of the synchronous instruction is completed, data transfer control information thus saved is loaded in the hold means to continue the data transfer by the asynchronous instruction.

According to the present invention, when a synchronous instruction is issued for an initiation of a data transfer during a data transfer caused by an asynchronous instruction, the data transfer in execution is temporarily interrupted to effect the data transfer requested by the synchronous instruction; consequently, the processing time required for the data transfer by the synchronous instruction to be immediately executed can be minimized.

Furthermore, even while the data transfer of the asynchronous instruction is being executed, the synchronous instruction can be issued, which simplifies the procedure to issue the synchronous instruction.

BRIEF DESCRIPTION OF THE DRAWINGS

These and other objects and advantages of the present invention will become apparent by reference to the following description and accompanying drawings wherein:

FIG. 7 is a timing chart showing a data transfer from the main storage to the extended storage by a synchronous instruction;

FIG. 8 is a timing chart depicting a data transfer from the extended storage to the main storage by an asynchronous instruction;

FIG. 12 is a configuration diagram schematically showing a configuration including registers for saving data transfer control information and registers for setting the data transfer control information.

DESCRIPTION OF THE PREFERRED EMBODIMENTS

A description will be given of an embodiment of the present invention in detail with reference to the accompanying drawings.

Figure 1:
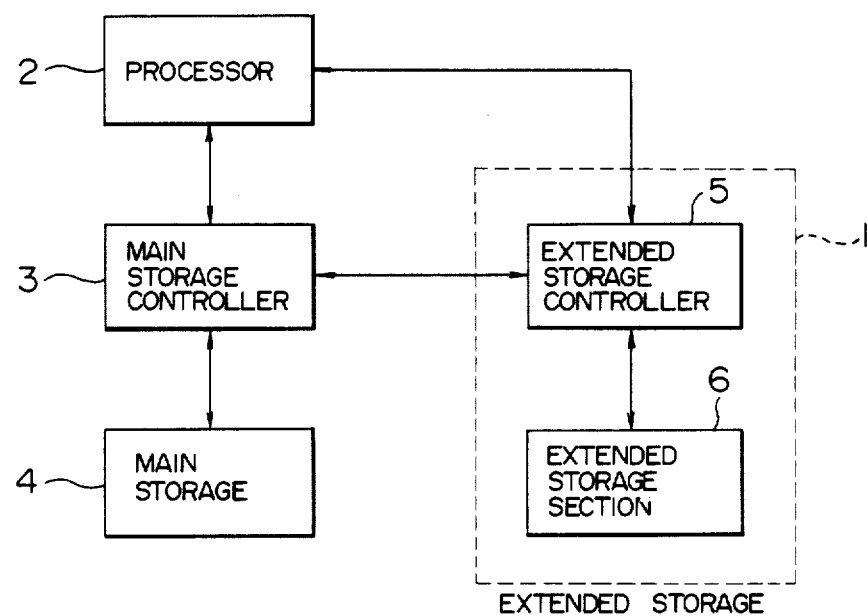
FIG. 1 is a schematic block diagram showing an information processing system to which the present invention is applied.

FIG. 1 is a schematic diagram illustrating an overall configuration of an information processing system having a main storage and an extended storage thereof. An extended storage 1 is connected to a processor 2 and further via a main storage controller 3 to a main storage 4. The extended storage 1 mainly includes an extended storage controller 5 for controlling a data transfer and an extended storage section 6 for storing data. The extended storage section 5 received from the processor 2 data transfer control informaiton (a first block address of the main storage, a first block address of the extended storage, a transfer block count, and an operation mode) of a synchronous instruction or a main storage address at which data transfer control information of an asynchronous instruction is stored and an initiation signal to control a data transfer between the extended storage section 6 and the main storage 4 through the main storage controller 3.

Figure 2:
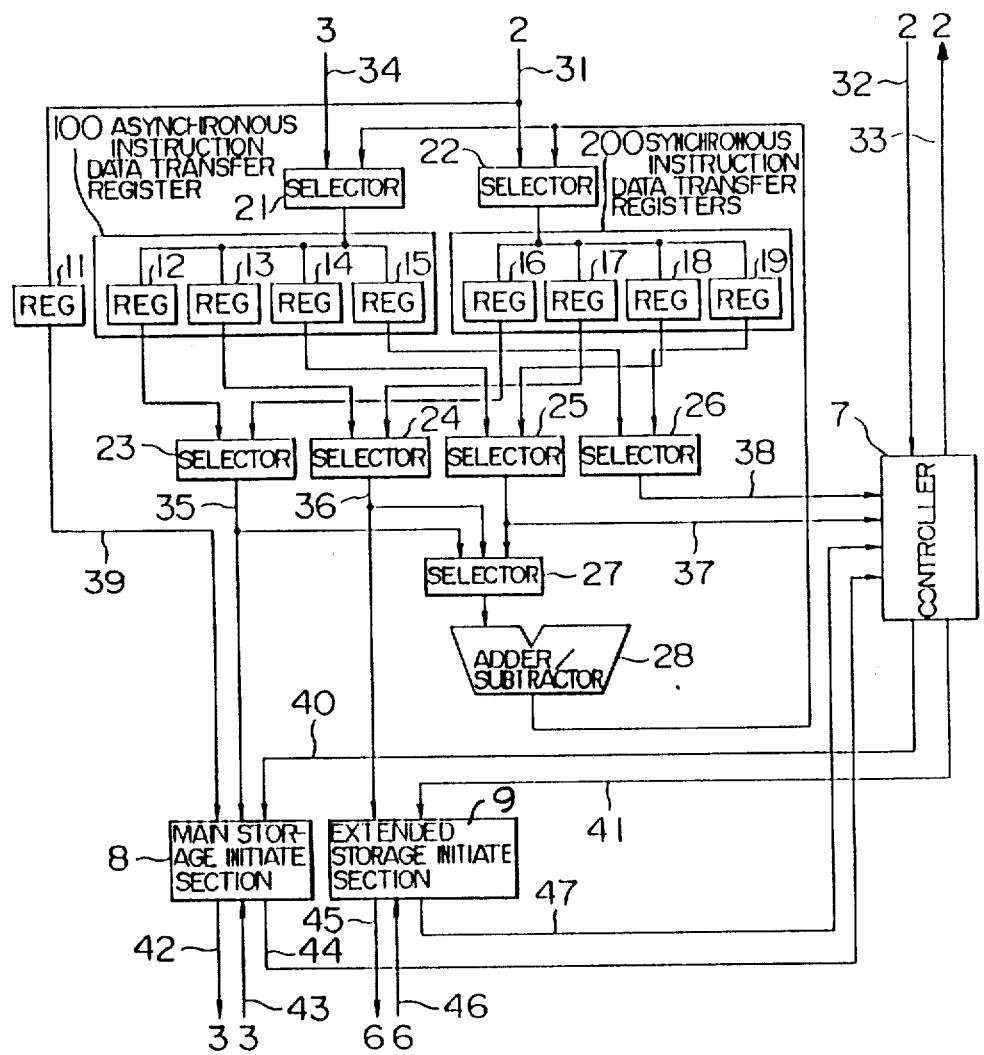
FIG. 2 is a schematic diagram illustrating an embodiment of the extended storage controller constituting the data transfer control apparatus according to the present invention.

FIG. 2 is a schematic diagram showing in detail an embodiment of the extended storage controller 5 included in the data transfer control apparatus according to the present invention. For simplification of the description, the configuration of FIG. 1 includes only the components of the control system, namely, the components of the data system are omitted.

The system of FIG. 2 includes a controller 7 controlling the overall extended storage controller, a main storage initiate section 8, and an extended storage initiate section 9. Reference numeral 100 is an asynchronous instruction data transfer control register including a main storage block address register 12, an extended storage block address register 13, a transfer block count register 14, and an operation mode register 15. Reference numeral 200 is a synchronous instruction data transfer control register comprising in a similar fashion a main storage block address register 16, an extended storage block address register 17, a transfer block count register 18, and an operaiton mode register 19. Reference numeral 11 is a command address register storing a main storage address at which data transfer control information of an asynchronous instruction is stored.

When the main storage initiate section 8 receives a command address 39 from the command address register 11 as a result of an issuance of an asynchronous instruction, the main storage initiate section 8 sends a main storage address 42 contained in the command address 39 to the main storage 4 through the main storage controller 3. Data transfer control information 34 of the asynchronous instruction sent from the main storage 4 via the main storage controller 3 based on the main storage address in the command address register 11 is passed through a selector 21 to be stored in the pertinent registers 12-15 of the data transfer register for asynchronous instruction 100. Similarly, data transfer control information 31 from the processor 2 is transferred via a selector 22 so as to be stored in the respective registers 16-19 of the data transfer control register for synchronous instruction 200. Either an output from each register of the data transfer control register for synchronous instruction 100 or an output from each register of the data transfer control register for asynchronous instruction 200 is selected by the selectors 23-26 so as to set a main storage block address 35, an extended storage block address 36, a remaining transfer block count 37, and an operation mode 38. At the time of data transfer operation, the addresses 35-36 and the block count 37 are selected by the selector 27 and are subjected to an addition/subtraction in the adder/subtractor 28; thereafter, the results are returned via the selector 21 or 22 to the pertinent registers of the data transfer control register for asynchronous instruction 100 or the data transfer control register for synchronous instruction 200.

The controller 7 issues initiate signals 40-41 in response to an initiation signal 32 from the processor 2 to activate the main storage initiate section 8 and the extended storage initiate section 9, respectively. The main storage initiate section 8 adds an address in block to the main storage block address 35 to attain a main storage address 42, thereby initiating the main storage 4 via the main storage controller 3. When initiated, the main storage 4 effects a data read or write operation and sends a completion report 43 via the main storage controller 3 to the main storage initiate section 8, which counts the completion report 43 received for each initiation of the main storage 4 so as to transmit a completion report 44 to the controller 7 when a block of data is read or written. Similarly, the extended storage initiate section 9 adds an address in block to the extended storage block address 36 to attain an extended storage address 45, thereby initiating the extended storage section 6. In response to the initiation, the extended storage section 6 also sends a completion report 46 to the extended storage section 6, which counts the completion report 46 received each time the extended storage section 6 is initiated so as to transmit a completion report 47 to the controller 7 when a block of data is read or written. When it is judged in the controller 7 that the data transfer is completed, a completion report signal 33 is fed to the processor 2 to terminate the operation.

Figure 3:
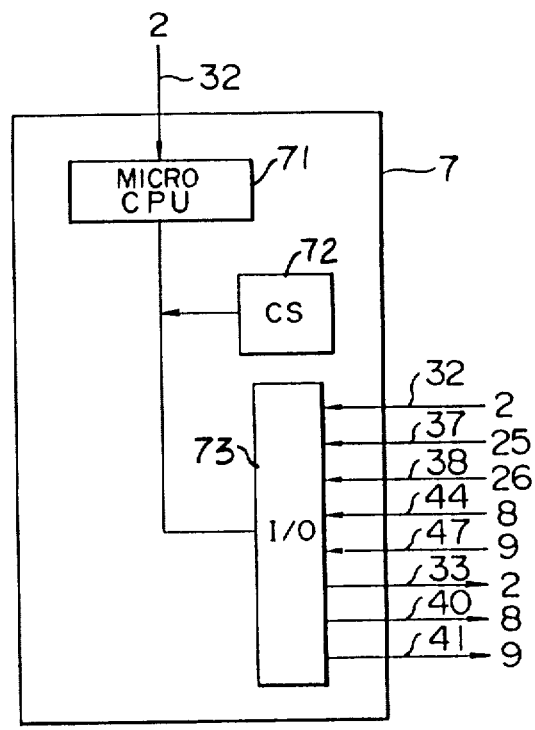
FIG. 3 is a schematic diagram illustrating the configuration of the controller in the embodiment of FIG. 2.

FIG. 3 shows the configuration of the controller 7 which includes a micro-computer having a micro CPU 71, a control storage (CS) 72, and an I/O section 73, which sends or receives various control signals in the extended storage controller 5 in addition to the control signals on the input/output lines of the controller 7 shown in FIG. 2. The micro CPU 71 receives the initiation signal 32 from the processor 2, reads status information from the extended controller 5 via the I/O section 73, and effects the control according to the program stored in the CS 72.

Figure 4:
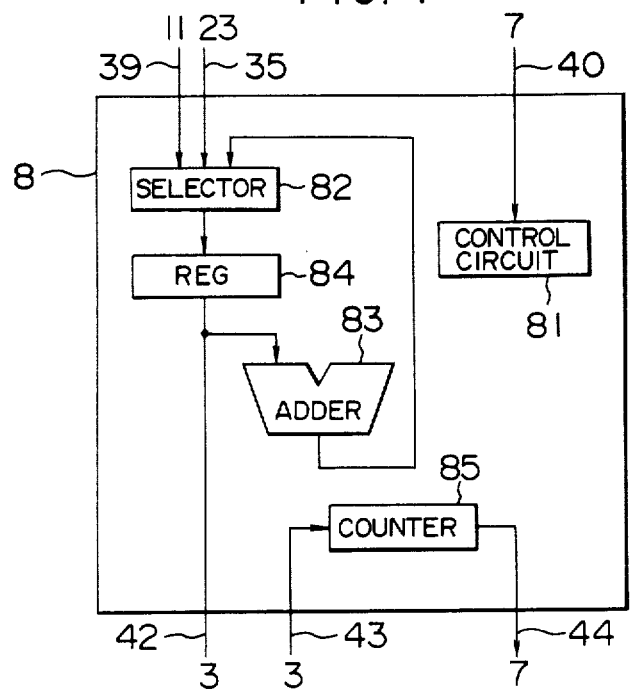
FIG. 4 is a schematic diagram depicting the configuration of the main storage initiate section in the embodiment of FIG. 2.

FIG. 4 shows the configuration of the main storage initiate section 8. On receiving an initiate signal 40 from the controller 7, the control circuit 81 is initiated to control the main storage initiate section 8. Under control of the control circuit 81, a selector 82 selects one of the outputs of the command address 39, the main storage block address 35, and the adder 83 and sets the output to the register 84. If a command address 39 is received as a result of an issuance of an asynchronous instruction, the main storage controller 3 is fed to the main storage 4 through the main storage controller 3; thereafter, according to a read completion report 43 through the main storage controller 3 from the main storage 4, a counter 85 sends a completion report to the controller 7. In a case where a main storage block address 35 for a data transfer between storages is received, the address 35 is first delivered to the main storage 4; thereafter, the content of the register 84 is supplied to the adder 83 to effect an addition depending on the amount of data read for each operation, thereby generating an address in block. The address in block is then set via the selector 82 to the register 84 so as to be sent to the main storage 4. The completion report 43 from the main storage 4 is counted by the counter 85, which transmits a completion report 44 when a block of data is counted.

Figure 5:
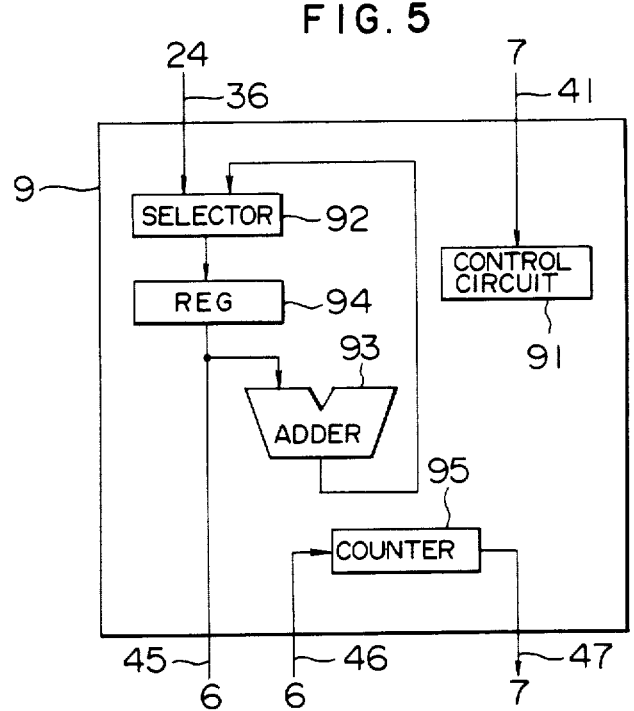
FIG. 5 is a schematic diagram illustrating the configuration of the extended storage initial section in the embodiment of FIG. 2.

FIG. 5 shows the configuration of the extended storage initiate section 9. A control circuit 91 is initiated by an initiate signal 41 from the controller 7 so as to control the extended storage initiate section 9. A selector 92 first sends an extended storage block address 36 from the selector 24 to a register 94 and subsequently supplies an output from an adder 93 to the register 94. The address loaded in the register 94 is transmitted as an extended storage address 45 to the extended storage section 6, thereby initiating the extended storage section 6. The address in the register 94 is delivered to the adder 93, which effects a computation to generate an address to be next sent to the extended storage section 6, which outputs a completion report to the counter 95 each time a data read or write operation is completed by use of the address 45. When a block of data transfer is recognized by the counter 95 through a predetermined number of counting operations of the completion report, the counter 95 sends a completion report 47 to the controller 7.

Figure 6:
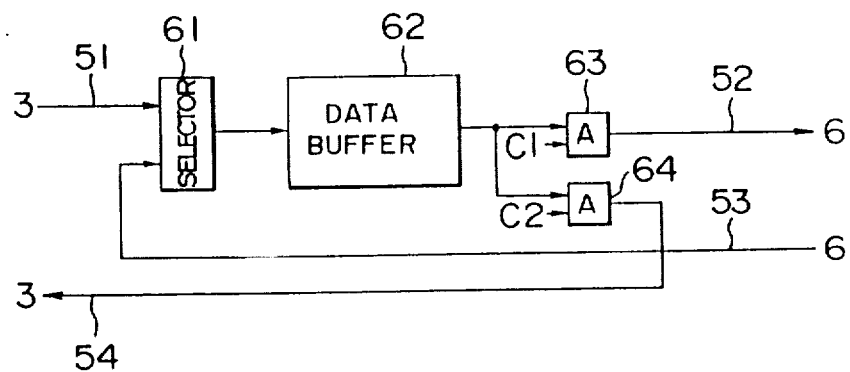
FIG. 6 is a schematic diagram depicting the configuration of a data buffer section of the extended storage controller.

FIG. 6 shows the configuration of a data buffer section used to achieve a data transfer between the main storage 4 and the extended storage 6. The data buffer section is located in the extended storage controller 5. In a case where data from the main storage 4 is transferred to the extended storage section 6, data 51 read from the main storage 4 via the main storage controller 3 is selected by a selector 61 so as to be temporarily stored in a data buffer 62. The data is then transferred as store data 52 via an AND gate 63 to the extended storage section 6. The AND gate 63 is triggered by a control signal C1 generated in the system when the data is transferred to the extended storage section 6. In a case where data is transferred from the extended storage section 6 to the main storage 4, data 53 read from the extended storage section 6 is selected by the selector 61 so as to be temporarily stored in the data buffer 62. The data is then sent to the main storage 4 through the main storage controller 3 as data 54 via an AND gate 64 which is triggered by a control signal C2 generated when transferring data to the main storage 4; furthermore, the data 54 is sent therefrom to the main storage 4. In this embodiment, the capacity of the data buffer 62 is 2K bytes.

Next, the operation of the extended storage controller 5 will be described with reference to an operation with a synchronous instruction, an operation with an asynchronous instruction, and an initiation with a synchronous instruction during a data transfer caused by an asynchronous instruction.

(1) Operation with a synchronous instruction

Before an initiation, data transfer control information 31 (including a main storage first block address, an extended storage first block address, a transfer block count, and an operation mode) is stored in the control register for synchronous instruction, namely, the information items are stored in the main storage block address register 16, the extended storage block address register 17, the transfer block count register 18, and the operation mode register 19, respectively. Since the data transfer of the present embodiment is assumed to be achieved in the block unit, the address and the transfer data quantity are specified by a block address and a block count, respectively.

After data transfer control information 31 is thus stored, the processor 2 delivers an initiate signal 32 to the controller 7 to notify an initiation of the synchronous type. On receiving the initiation, the controller 7 operates the selectors 23-26 to effect selection on the control register for synchronous instruction 200. Next, by referring the operation mode 38, the controller 7 causes the main storage initiate section 8 and the extended storage initiate section 9 to start a read or write operation of a block of data. That is, if the operation mode 38 indicate a data transfer from the main storage 4 to the extended storage section 6, a read operation and a write operation are initiated for the main storage initiate section 8 and the extended storage initiate section 9, respectively. When the operation mode 38 indicates a data transfer from the extended storage section 6 to the main storage 4, a read operation and a write operation are initiated for the extended storage section 9 and the main storage 4, respectively. Next, the controller 7 prepares for a data transfer of the next block. Namely, the main storage block address, the extended storage block address, and the remaining transfer block count are respectively updated in the registers 16-18. First, the selector 27 is operated to select the main storage block address 35, which is added to one in the adder/subtractor 28. Next, the selector 22 is activated to select the output from the adder/subtractor 28 to store the result of the addition in the main storage block address register 16. In the similar procedure, the extended storage block address 36 is added to one and the result is stored in the extended storage block address register 17. The remaining transfer block count 37 is decremented by one and the resultant value is stored in the transfer block count register 18.

On receiving an initiation of a data transfer of a block, the main storage initiate section 8 adds a predetermined address to the main storage block 35 to attain a main storage address 42, which is used to initiate the main storage 4 via the main storage controller 3. In a case where data is transferred from the main storage 4 to the extended storage section 6, data read from the main storage 4 is stored in the data buffer 62 of FIG. 6. In a case where data is transferred from the extended storage section 6 to the main storage 4, data read from the extended storage section 6 and stored in the data buffer 62 is written in the main storage 4.

When the data read or write operation is finished in the main storage 4, a completion report is supplied to the main storage initiate section 8, which in response to the completion report sends the next address in block internally generated by an addition of a predetermined address to the main storage 4 via the main storage initiate section 3, thereby initiating the main storage 4. Thereafter, the number of completion reports is counted.

On receiving an initiation of a data transfer of a block, the extended storage initiate section 9 adds a predetermined address in block to the extended storage block address 36 to obtain an extended storage address 42, which is used to initiate the extended storage section 6. When data is to be transferred from the extended storage section 6 to the main storage 4, data read from the extended storage section 6 is stored in the data buffer 62; whereas when data is to be transferred from the main storage 4 to the extended storage section 6, the data stored in the data buffer 62 is written in the extended storage section 6. When the data read or write operation is finished in the extended storage section 6, a completion report 46 is notified to the extended storage initiate section 9, which in response to the completion report sends the next address in block internally generated to the extended storage section 6, thereby initiating the extended storage section 6. Thereafter, the completion report is counted.

Referring now to the timing charts of FIGS. 7–8, a description will be given of a data transfer between the main storage 4 and the extended storage section 6 by use of a synchronous instruction.

FIG. 7 shows a timing chart of a data transfer from the main storage 4 to the extended storage section 6 by use of a synchronous instruction. On receiving an initiation by an initiate signal 32 from the processor 2, the controller 7 decodes an instruction, initializes the selectors 23–26 and the like, instructs the main storage initiate section 8 to start a read operation, and then the main storage initiate section 8 activates the main storage 4. In this embodiment, data is read from the main storage 4 in the unit of 32 bytes each time the initiation is effected and the 32-byte data is stored in the data buffer 62. The controller instructs a write operation to the extended storage initiate section 9; however, the initiation of the extended storage section 6 by the extended storage initiate section 9 is conducted each time data of 1K byte from the main storage 4 is stored in the data buffer 62 after the initiation from the controller 7 is issued. As a result, data in the unit of 1K byte is stored in the extended storage section 6. In the present embodiment, the data read from the main storage 4 is of 4K bytes, namely, 32 bytes × 128 read operations, and the 4K-byte data is stored in the extended storage section through four write operations × 1K byte. When the extended storage initiate section 9 receives from the extended storage section 6 a completion report notifying the end of the four write operaitons, the extended storage initiate section 9 sends a completion report of a block of data to the controller 7, which then checks the transfer block count 37 for the remaining data, which count has been updated together with other transfer control information after initiation of transfer of the data block which has been transferred. If there exists data to be further transferred, the main storage address and the extended storage address each constituting data transfer control information are updated. When the data transfer is judged to be completed, the completion report signal 33 is fed to the processor 2 to terminate the operation. In FIG. 7, for simplicity of the description, the completion report from the main storage 4 after the initiation thereof is omitted.

FIG. 8 is a timing chart schematically illustrating a data transfer from the extended storage section 6 to the main storage 4 by a synchronous instruction. On receiving an initiation by an initiate signal 32 from the processor 2, the controller 7 decodes an instruction, effects an initialization, and instructs a read operation to the extend storage initiate section 9, which then activates the extended storage section 6. From the extended storage section 6, 1K-byte data is read and is stored in the data buffer 62. With a write instruction indicated from the controller 7 to the main storage initiate section 8, when the data from the extended storage sectoin 6 is loaded in the data buffer 62, the main storage initiate section 8 sends an initiate signal to the main storage 4, which causes the data to be written from the data buffer 62 into the main storage 4 in a unit of 32 bytes at a time. Each time 1K-byte data is written in the main storage 4, the data from the extended storage section 6 is written in the data buffer 62, namely, 1K bytes/block × 4 write operations take place to load the data from the extended storage section 6 into the data buffer 62. The data is then written in the main storage 4 therefrom through 32 bytes × 128 write operations. On receiving 128 completion reports each associated with the data write operation in the main storage 4, the main storage initiate section 8 notifies the controller 7 that a block of data has been completely transferred. When it is determined from the transfer block count 37 which has been updated that further data transfer is necessary, the controller 7 delivers the initiate signals respectively to the main storage initiate section 8 and the extended storage initiate section 9 to continue the data transfer. When the data transfer is completed, the controller 7 sends a completion report signal 37 to the processor 2 to terminate the operaiton. In FIG. 8, the completion report from the extended storage section 6 is omitted for simplicity.

As described above, the main storage initiate section 8 and the extended storage initiate section 9 are operated to write in the extended storage section 6 the data read from the main storage 4 or to write in the main storage 4 the data read from the extended storage section 6. On receiving the completion report from the main storage initiate section 8 or the extended storage initiate section 9, the controller 7 checks the remaining transfer block count 37. If the block count 37 is zero, the controller 7 issues a completion report signal 33 to the processor 2 to notify the end of the data transfer, thereby terminating the operation. If the remaining transfer block count 37 is other than zero, the 1-block data transfer is initiated for the main storage initiate section 8 and the extended storage initiate section 9, which is repeatedly effected until the remaining transfer block count 37 becomes to be zero.

(2) Operation by asynchronous instruction

For an asynchronous instruction, the operation is achieved through a procedure for an execution of an I/O instruction generally used. That is, after storing the main storage address where data transfer control information is stored in the command address register 11, the processor 2 issues an initiate signal 32 to the controller 7 to start an asynchronous-type initiation. The controller 7 initiates the main storage initiate section 2 to read data transfer control information 34 from the main storage 4 by use of the command address 39 as a main storage address 40. The elements of the obtained information 34 are stored in the main storage block address register 12, the extended storage block address register 13, the transfer block count register 14, and the operation mode register 15, respectively of the control register for asynchronous instruction 100. Next, the selectors 23-26 are operated to select the control register for asynchronous instruction 100. Thereafter, using the synchronous instruction control register 100, the data transfer is achieved between the main storage 4 and the extended storage section 6 in the similar operation to that effected for the synchronous instruction.

Figure 9:
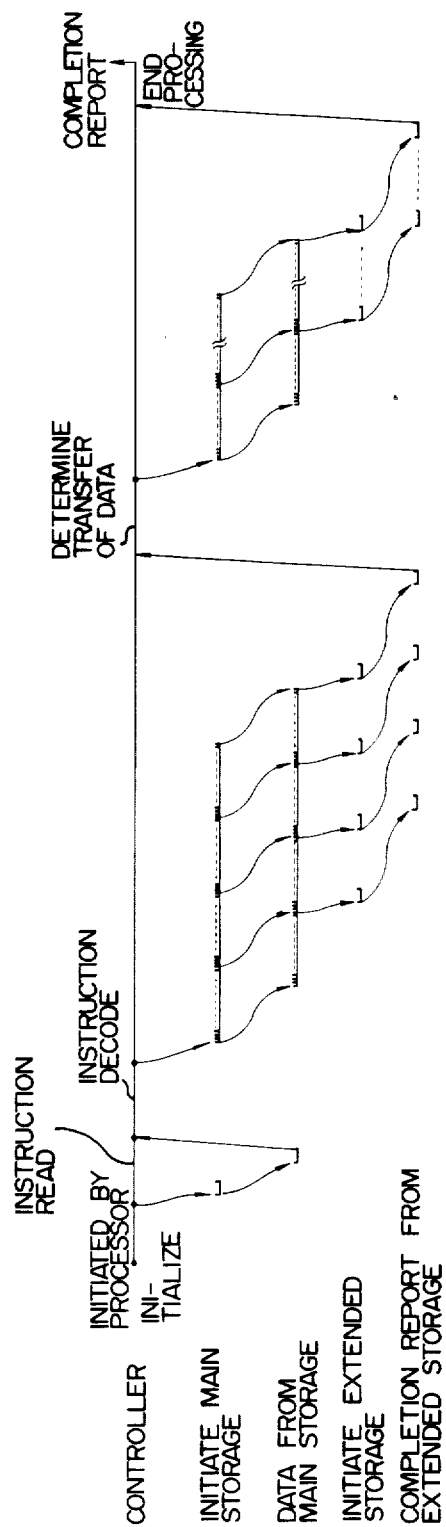
FIG. 9 is a timing chart depicting a data transfer from the main storage to the extended storage by an asynchronous instruction.
Figure 10:
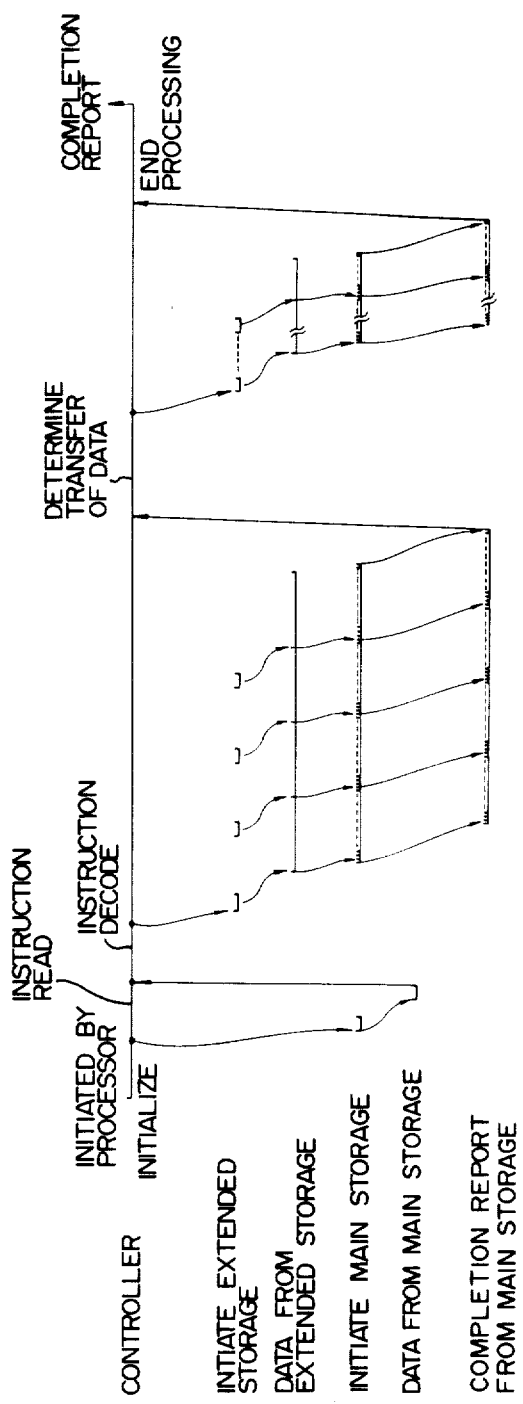
FIG. 10 is a timing chart depicting a data transfer from the extended storage to the main storage by an asynchronous instruction.

FIG. 9 is a timing chart showing a data transfer from the main storage 4 to the extended storage section 6 by use of an asynchronous instruction, whereas FIG. 10 is a timing chart illustrating a data transfer from the extended storage section 6 to the main storage 4 by use of an asynchronous instruction. In both cases of FIGS. 9-10, the controller 7 sends, in response to an asynchronous instruction issued from the processor 2 to the controller 7, an instruction to the main storage initiate section 8 to start a read operation. The main storage initiate section 8 sends the command address 38 as a main storage address 42 to the main storage 4, decodes an instruction read from the main storage 4, and sets predetermined data to the control register for asynchronous instruction 100 based on the contents of the instruction. Thereafter, the timing charts of FIG. 9 and 10 are the same to each other.

(3) Initiation by a synchronous instruction during data transfer caused by an asynchronous instruction For the data transfer caused by an asynchronous instruction, only the control register for asynchronous instruction 100 is used, namely, the control register for synchronous instruction is not operated. As a consequence, even during a data transfer of an asynchronous instruction, the processor 2 can store data transfer control information 31 in the control register for synchronous instruction 200 so as to subsequently effect a synchronous-type initiation. On receiving an initiation, the controller 7 enters a state to wait for a completion report indicating an end of a transfer of a block of data from the main storage initiate section 8 and the extended storage initiate section 9. When the completion report is received, the controller 7 interrupts the data transfer associated with the asynchronous instruction and then operates the selectors 23-26 to select the control register for synchronous instruction 200, thereby achieving the data transfer by means of the control register 200. When a specified number of blocks are completely transferred, the controller 7 notifies the completion report to the processor 2, operates the selectors 23-26 to select the control register for asynchronous instruction 100, which causes the data transfer of the asynchronous instruction to be resumed. Since the control register for asynchronous instruction 100 contains control information saved at the interruption, only the operation of the selectors is required to resume the interrupted processing.

Figure 11:
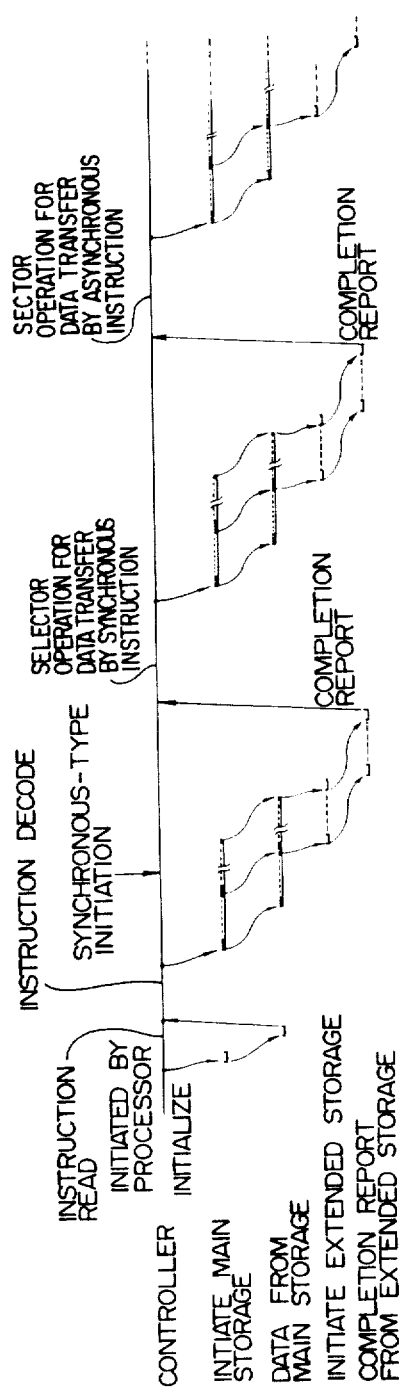
FIG. 11 is a timing chart illustrating a case where during a data transfer from the main storage to the extended storage by an asynchronous instruction, a data transfer is effected by a synchronous instruction from the main storage to the extended storage.

FIG. 11 is a timing chart showing a case where a data transfer request from the main storage 4 to the extended storage section 6 is issued by use of a synchronous instruction while a data transfer is being executed by an asynchronous instruciton from the main storage 4 to the extended storage section 6. After a synchronous-type initiation is requested from the processor 2 to the controller 7, if a completion report of a transfer of the pertinent block is received from the extended storage controller 9, the controller 7 sets the selectors 23-26 to effect a data transfer of the synchronous instruction and initiates thereby the main storage initiate section 8 to cause a data transfer from the main storage 4 to the extended storage 1. When the data transfer of the synchronous instruction is completely executed and a completion report from the extended storage initiate section 9 is received, the controller 7 operates the selectors 23-26 to be set to achieve a data transfer by the asynchronous instruction, and resumes the interrupted data transfer of the asynchronous instruction. Also in cases e.g. where a data transfer request is made by a synchronous instruction to transfer data from the extended storage section 6 to the main storage 4 while a data transfer is being executed by an asynchronous instruction from the main storage 4 to the extended storage section 6, the data transfer of the asynchronous instruction is interrupted to effect the data transfer associated with the synchronous instruction and then the interrupted data transfer of the asynchronous instruction is resumed.

According to the embodiment, since data transfer control information of a synchronous instruction can be stored in a control register during a data transfer caused by an asynchronous instruction; furthermore, the transition from the asynchronous instruction to the synchronous instruction and the restoration from the synchronous instruction to the asynchronous instruction can be effected only through the operation of the registors, the processing time is minimized both for the synchronous instruction and the asynchronous instruction; moreover, the control of the operation is simplified.

In the embodiment, in order to make the description simple, it is so made that the initiation of the main storage initiate section and the initiation of the extended storage initiate section 9 for the data transfer of the next block are carried out after the end of transfer of one block of data. However, as it is apparent from FIGS. 7, 8, 9 and 10, there is time in which the data transfer is not carried out between data transfers of blocks and this becomes an obstacle in carrying out high speed data transfer. Therefore, in order to carry out transfer of data blocks continuously, the data transfer may be made by a precontrol or control in advance to initiate the main storage initiate section 8 and the extended storage initiate section 9 for the data transfer of the next block without waiting for or before the end of data transfer of current block.

According to the embodiment above, although two sets of control registers are provided for the synchronous and asynchronous instructions as means to enable an initiation by a synchronous instruction during a data transfer caused by an asynchronous instruction, the means are not restricted by the control registers. For example, the system may be configured with a register to save control information when the data transfer of the asynchronous instruction is interrupted so as to restore saved control information in the control register when the interrupted processing is resumed.

FIG. 12 shows an example of a configuration including a save register to save control information. In the system of FIG. 12, control registers 12-15 are commonly used for an asynchronous instruction and a synchronous instruction. When a data transfer request is made by a synchronous instruction during a data transfer of an asynchronous instruction, the data transfer control data of the asynchronous instruction in the control registers 12-15 is set to save registers 301-304, whereas the control registers 12-15 are loaded via selectors 305-308 with data transfer control information of the synchronous instruction. When the data transfer associated with the synchronous instruction is completed, the contents of the registers 301-305 are set via the selectors 305-308 to the control registers 12-15 so as to resume the interrupted data transfer of the asynchronous instruction. The selectors 305-308 are supplied via a selector 309 with outputs from the processor 2, the main storage controller 3, and the adder/subtractor 28. The outputs from the registers 12-15 are directly connected to the main storage initiate section 3 without passing through the selectors 23-26.

A memory area of the main storage 4 or the extended storage section 6 may be used in place of the save registers.

While the present invention has been described with reference to the particular illustrative embodiments, it is not restricted by those embodiment but only by the appended claims. It is to be appreciated that those skilled in the art can change and modify the embodiments without departing from the scope and spirit of the invention.

We claim:

1. An apparatus for controlling a data transfer between storages having a main storage, an extended storage, a transmission path between said main storage and said extended storage for transmitting data therebetween, a data buffer provided on said transmission path, and a processor in which the data is transferred between the main storage and the extended storage by use of a synchronous instruction and an asynchronous instruction comprising:

means for holding data transfer control information supplied from the processor in response to the synchronous instruction;

means for holding data transfer control information supplied from the processor in response to the asynchronous instruction;

select means for selecting data transfer information held in a one of said hold means; and control means for selecting, by means of said select means, the hold means associated with an instruction depending on whether the instruction is a synchronous instruction or an asynchronous instruction, for controlling the data transfer between said main storage and said extended storage based on a content of said selected hold means, and for updating the content of said selected hold means according to an amount of data to be transferred, wherein said control means, when a request of a data transfer is issued by a synchronous instruction while a data transfer caused by an asynchronous instruction is being executed, controls to interrupt the data transfer of the asynchronous instruction and to select by use of said select means the information in said hold means holding data transfer control information of the synchronous instruction; and in response to a completion of the data transfer, said control means controls said select means to select the information in said hold means holding data transfer control information of the asynchronous instruction by means of said select means and to resume the data transfer of the asynchronous instruction interrupted, wherein the data transfer between said main storage and said extended storage is effected in a unit of a block of data, the data transfer by the asynchronous instruction comprising transfer of a plurality of blocks, and when a data transfer is requested by a synchronous instruction during a data transfer caused by an asynchronous instruction, said select means are caused, in response to a completion of a transfer of a block of the data, to select the content of said hold means holding data transfer control information of the synchronous instruction, thereby achieving a data transfer of the synchronous instruction.

2. A data transfer control apparatus according to claim 1 including:

hold means for holding any one of data transfer control information of the asynchronous instruction and the synchronous instruction, and save means connected to said hold means for saving said information of said asynchronous and synchronous instructions in said hold means, wherein, when a data transfer request is made by a synchronous instruction while a data transfer of an asynchronous instruction is taking place, the data transfer control information of the asynchronous instruction held in said hold means is saved in said save means, the data transfer control information of the synchronous instruction is held in said hold means to effect a data transfer by the synchronous instruction, and in response to a completion of the data transfer, the content of said save means for saving data is returned to said hold means, thereby achieving a data transfer of the asynchronous instruction interrupted.

3. A data transfer control apparatus according to claim 2, wherein said save means for saving data is a storage area of said main storage or a storage area of said extended storage.

* * * * *